US012649105B2

(12) United States Patent 
Raina et al.

(10) Patent No.: US 12,649,105 B2 
(45) Date of Patent: Jun. 9, 2026

(54) SYSTEMS AND METHODS FOR DYNAMICALLY ANALYZING AND MODIFYING GAME ENVIRONMENT

(71) Applicant: Sony Interactive Entertainment Inc., Tokyo (JP)

(72) Inventors: Ayush Raina, San Mateo, CA (US); Lakshmish Kaushik, San Jose, CA (US); Chockalingam Ravi Sundaram, Belmont, CA (US); Kusha Sridhar, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 202 days.

(21) Appl. No.: 18/325,383

(22) Filed: May 30, 2023

(65) Prior Publication Data

US 2024/0399247 A1     Dec. 5, 2024

(51) Int. Cl.
A63F 13/52 (2014.01)
A63F 13/79 (2014.01)

(52) U.S. Cl.
CPC .............. A63F 13/52 (2014.09); A63F 13/79 (2014.09)

(58) Field of Classification Search
CPC .......... A63F 13/47; A63F 13/52; A63F 13/54; A63F 13/67; A63F 13/79
See application file for complete search history.

(56) References Cited

U.S. PATENT DOCUMENTS

| 2016/0059127 | A1* | 3/2016 | Perrin | A63F 13/40 |
| | | | | 348/180 |
| 2020/0298128 | A1* | 9/2020 | Yannakakis | G06N 20/10 |
| 2020/0338456 | A1* | 10/2020 | Atli | A63F 13/79 |
| 2020/0384367 | A1* | 12/2020 | Lake-Schaal | G06N 5/04 |

OTHER PUBLICATIONS

International Search Report dated Sep. 16, 2024 in International Application No. PCT/IB2024/055233.
Written Opinion dated Sep. 16, 2024 in International Application No. PCT/IB2024/055233.

* cited by examiner

*Primary Examiner* — Jason T Yen
(74) *Attorney, Agent, or Firm* — Kilpatrick Townsend & Stockton LLP

(57) ABSTRACT

System, process and device configurations are provided for analyzing and modifying a game environment. A method can include generating at least one game scenario for an electronic game including control settings for an audio configuration, a video configuration and a gameplay configuration. The method may include outputting the at least one game scenario using the control settings, and detecting user interest for the at least one game scenario. User interest for the at least one game scenario may be detected using a kernel function including a kernel element for each of a visual style, an audio style and a gameplay style. User profile data may be updated for the at least one user based on detected user interest for the at least one game scenario. Output of a game state may be controlled for the electronic game using the user profile.

18 Claims, 6 Drawing Sheets

300

600

700

800

SYSTEMS AND METHODS FOR DYNAMICALLY ANALYZING AND MODIFYING GAME ENVIRONMENT

FIELD

The present disclosure is directed to interactive entertainment and electronic video gaming, including gaming device operations, processes, configurations, user interface control and control device configurations.

BACKGROUND

Computer and console games offer players different types of gaming experiences. As game systems evolve to include increased processing power and display quality, gaming content also improves to include presentation of high quality graphical elements in addition to player controlled elements. There is a desire to provide customization and tailoring to users for gaming content. Conventional development processes may limit the ability of developers to provide game content suitable to all users. In addition, some users may not be able to control game settings to account for personal preferences and user ability. In addition, personalization of gaming content for users may improve the gaming experience. Accordingly, there is a need and a desire for game systems and devices to provide user ability to control gaming content. There is a need and a desire for gaming systems to improve controllability of device operation including improving device interface control.

BRIEF SUMMARY OF THE EMBODIMENTS

Disclosed and described herein are systems, methods and configurations for dynamically analyzing and modifying a game environment. In one embodiment, a method includes generating, by a device, at least one game scenario for an electronic game, wherein the at least one game scenario includes control settings for an audio configuration, a video configuration and a gameplay configuration. The method also includes outputting, by the device, the at least one game scenario using the control settings, and detecting, by the device, user interest for the at least one game scenario for at least one user, wherein user interest for the at least one game scenario is detected using a kernel function including a kernel element for each of a visual style, an audio style and a gameplay style. The method also includes updating, by the device, a user profile for the at least one user based on detected user interest for the at least one game scenario. The method also includes controlling, by the device, output of a game state for the electronic game using the user profile.

In one embodiment, the control settings for the audio configuration including at least one of a sound style and audio output style, control settings for the video configuration including at least one of a light level, color scheme, and scenery, and control settings for the gameplay configuration including at least one of a combat level, exploration level and narrative level.

In one embodiment, the at least one game scenario includes a first game scenario and a second game scenario, wherein the first game scenario includes a first set of control settings and the second game scenario includes a second set of control settings.

In one embodiment, detecting user interest includes determining a value for user time associated with the at least one game scenario.

In one embodiment, detecting user interest includes characterizing user game element control associated with the at least one game scenario.

In one embodiment, detecting user interest includes characterizing user control inputs associated with the at least one game scenario.

In one embodiment, detecting user interest includes characterizing user interaction with game elements in the at least one game scenario.

In one embodiment, updating the user profile includes classifying the at least one user with at least one hierarchical data cluster for game scenario parameters.

In one embodiment, controlling output of the game state includes modifying at least one parameter of the electronic game with an updated user profile for the at least one user.

In one embodiment, the method includes modifying game output of the electronic game using detected user interest.

Another embodiment is directed to a device configured for dynamically analyzing and modifying a game environment. The device includes an interface, memory storing executable instructions, and a controller coupled to the interface and memory. The controller is configured to generate at least one game scenario for an electronic game, wherein the at least one game scenario includes control settings for an audio configuration, a video configuration and a gameplay configuration. The controller is configured to output the at least one game scenario using the control settings. The controller is configured to detect user interest for the at least one game scenario for at least one user, wherein user interest for the at least one game scenario is detected using a kernel function including a kernel element for each of a visual style, an audio style and a gameplay style. The controller is configured to update a user profile for the at least one user based on detected user interest for the at least one game scenario. The controller is configured to control output of a game state for the electronic game to the interface using the user profile.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
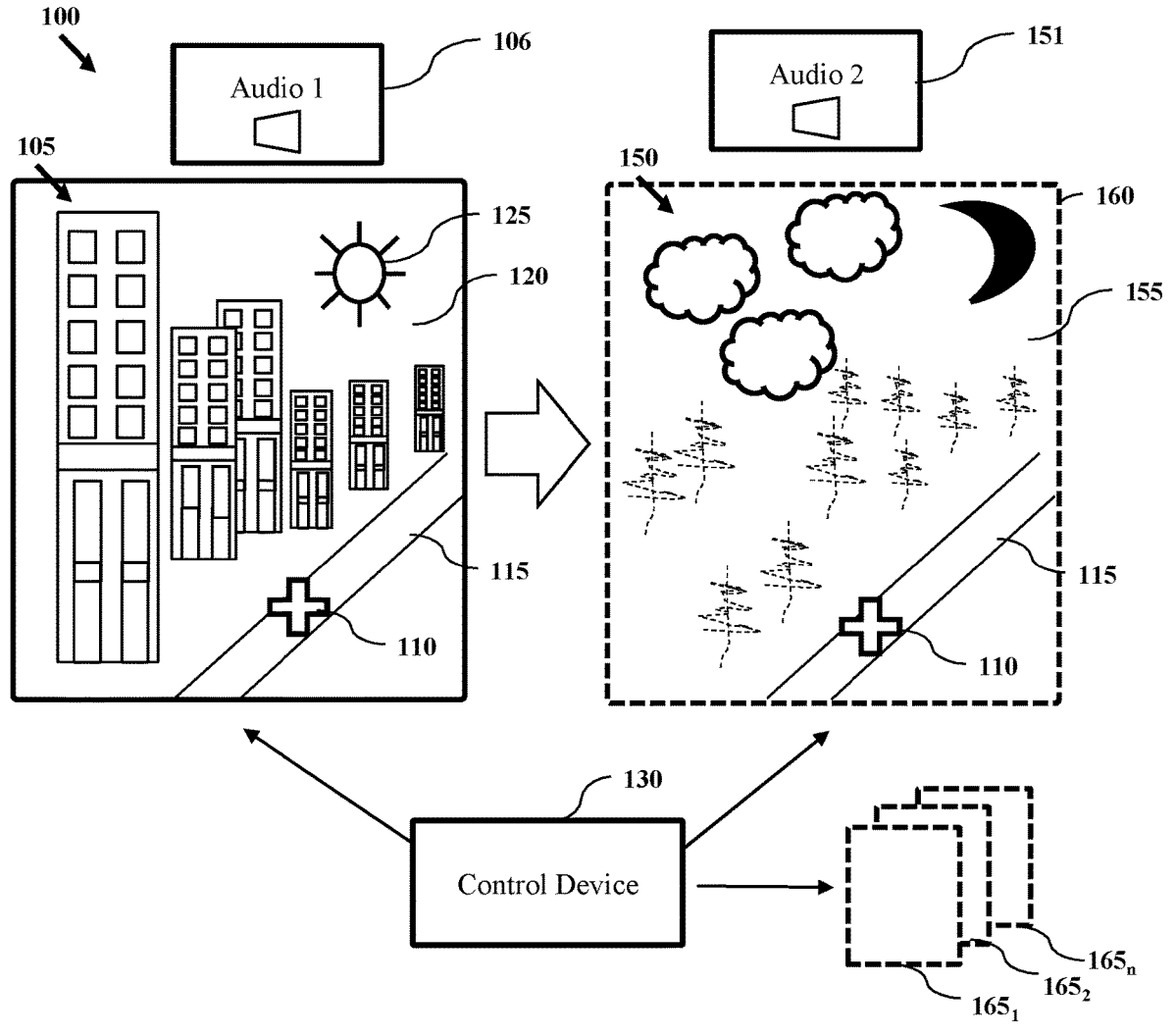
FIG. 1 is a graphical representation of dynamically analyzing and modifying a game environment according to one or more embodiments.

One aspect of the disclosure is directed to dynamically analyzing and modifying game environments. Modification of a game may include controlling one or more game parameters of a game environment to provide one or more scenarios for a user to play and/or explore. Game scenarios may be generated and provided to a user by a gaming system or gaming device to identify one or more preferences of a user and to customize game parameters for a user. Embodiments are directed to systems, devices and methods for game operations and controls, including operations for generating scenarios, analyzing user interest and modification of game presentation. Gaming systems may include consoles that play game media, consoles that provide network data for games, handheld devices, mobile devices (e.g., tablets, mobile phones, etc.) and devices in general configured for electronic gaming.

According to embodiments, processes and configurations are provided for analysis and control of game content. Processes and device configurations improve operations and allow for ranges of control characteristics across one or more dimensions to be experimented for users and tailored to users. According to embodiments, at least one parameter may be controlled for game content to adjust presentation of a game scenario. Game media may provide one or more game engine functions including graphics, game vectors, game story line, game levels, game characters and game elements. Processes described herein allow for modification of parameters while retaining one or more elements of game media. In addition, processes and configurations provide a solution for identification of parameters that improve game play experience and provide user personalization. In addition, processes and configurations allow for game elements to be modified across a group to allow for configurations that are tailored to one or more users or players in a joint gaming session. Embodiments provide processes and configurations to dynamically modify game environments and real time data collection. In addition, modifications to game environments may be based on one or more scenarios that allow user operation and exploration.

According to embodiments, processes and device configurations are provided including a framework for generating game scenarios, in-game levels, or worlds for users. Game data may be presented and/or generated using a framework including one or more operations for experimentation, analysis and game implementation. The framework can include detection and processing of data using one more models, such as a machine learning (ML) model to extract gameplay preferences of the user. Embodiments may including controlling styles of one or more of visual, audio, and gameplay preferences. Using generated scenarios, user style, interest, preference, and/or preferences which can be later utilized to augment the gameplay further. The framework can include an experimentation including generating several in-game levels or worlds designed for one or more users. Scenarios may be presented to a user and operations monitored to identify interaction behavior. According to embodiments, preferences may be detected and captured using a kernel function including kernel elements for one or more of a visual style, audio style, and gameplay style. Detection of user preferences may be dynamic and performed during gameplay. In addition, kernel functions may be used for implementation of user preferences towards generation of scenarios for a user and for updating a user profile. For example, future game play sessions may be presented based on updates to a user profile.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 is a graphical representation of dynamically analyzing and modifying a game environment according to one or more embodiments. According to embodiments, process 100 includes presenting at least one game scenario, such as a first game scenario 105 and a second game scenario 150. According to embodiments, process 100 may be performed by a device, such as a control device 130 and/or one or more system components. According to embodiments, control device 130 may be configured to generate game scenarios, such as first game scenario 105 and a second game scenario 150, as part of presenting a game for a user. According to other embodiments, control device 130 may be configured to generate game scenarios to analyze user interest and determine user profile updates.

FIG. 1 illustrates process 100 including generating first game scenario 105, the game scenario including a game object 110, game pathway 115, gameplay environment 120, and background element 125. In FIG. 1, an exemplary game play environment is shown for an urban environment, wherein game object 110 and game pathway 115 are game elements. Gameplay environment 120 and background element 125 may be determined by control device 130 as one or more parameters of settings selected by the control device for generating game scenario 150. According to embodiments, control device 130 may be configured to modify the presentation of a game from first game scenario 105 to second game scenario 150. First game scenario 105 may also include one or more audio components output with the graphical elements, such as first audio configuration 106 (e.g., Audio 1). Second game scenario 150 is shown including game object 110 and game pathway 115, with gameplay environment 155 and background element 160. Second game scenario 150 may also include one or more audio components output with the graphical elements, such as second audio configuration 151 (e.g., Audio 2). According to embodiments, generating each game scenario can include setting one of more of an audio configuration, video configuration and gameplay configuration for each game scenario. According to embodiments, game scenario 105 may be generated to using control settings for a first audio configuration, a first video configuration and a first gameplay configuration. Game scenario 150 may be generated to using control settings for one or more updated parameters, such as a second audio configuration, a second video configuration and a second gameplay configuration. According to embodiments, control device 130 and process 100 may include controlling one or more control settings for each of audio, video and gameplay settings and detecting user interaction with the gameplay scenarios. Gameplay settings for game scenario 105 and game scenario 150 may be also include one or more parameters and updates for gameplay style. For example, game scenario 105 may be generated with gameplay set for exploration while gameplay scenario 150 may be configured for a battle mode. Similarly, game scenario 105 may be configured as a battle mode and game scenario 150 may be a retro battle mode, such that the battle mode is altered to include one or more classic attributes. Updating of the game scenarios may allow for addressing one or more characteristics of game play for users.

According to embodiments, process 100 may be performed by a device, such as a gaming console, handheld gaming device, computer, tablet, mobile phone, etc. Process 100 may be initiated when gaming content is received or initiated. Process 100 may be performed by control device 130, such as a gaming device, where game scenarios are presented to an output device, such as a display and one or more sound output devices. Game scenarios 105 and 150 as illustrated may represent display output configurations.

According to embodiments, first game scenario 105 and second game scenario 150 may be generated to provide personalization of the gameplay features including game environments. In addition, the generated game scenarios may allow for implicit and/or explicit creation of game environments (and consequently experiences) for a user. Game scenarios may be used to identify and generate a virtual space (e.g., metaverse) representing choices and may be based on personalization. Game scenarios may be generated to provide a personal version of an electronic game without requiring re-design requirements from a game publisher. According to embodiments, game scenarios may be generated with a game engine where one or more kernel functions may be used to represent the style and preferences of the user. Operations and processes discussed herein, including process 100, allow for game dynamics to be computed on a server and personalization of the game locally, and for transformations of graphics and other front-end renderings may be performed by a control device such as a gaming console, media player, etc.

According to embodiments, and as shown in FIG. 1, process 100 for dynamically analyzing and modifying a game environment may include presentation of an electronic game using a first game scenario, such as first game scenario 105 for at least a period of time. Control device 130 may be configured to generate first game scenario 105 and analyze user interest. Control device 130 may be configured to update the display/presentation of the electronic game to present a second game scenario, second game scenario 150. Presentation of a second game scenario may be based on an experiment phase for detecting user preferences and updating an user profile. According to other embodiments, first game scenario 105 may relate to an output configuration for an electronic game and control device 130 may be configured to modify the output configuration to include one or more parameters for presentation as second game scenario 150. Game scenarios may be generated and/or determined by control device 130, which may be local to a user. As such, with local game media, or game media received over a network connection, control device 130 may modify game media for presentation to a user with one or more parameters determined, rendered, and/or defined local to a user. Put another way, game media may not require data/pre-rendered content for each game scenario. Rather, game media data may be used and control device 130 may be configured for generating video and audio data output to a user using game data. Control device 130 may perform one or more processes described herein.

According to embodiments, process 100 may generate multiple scenarios (e.g., at least two or more, a number "N", etc.) shown as game scenarios $165_{1-n}$ to capture data for analysis and categorization of user preferences and user interest. Process 100 may generate game scenarios $165_{1-n}$ in addition to first game scenario 105 and second game scenario 150 to generate multiple scenarios (or experiments) to gather and identify meaningful data about player preferences. Scenarios may be generated similarly to include an audio configuration, a video configuration and a gameplay configuration, with user interest for the game scenarios $165_{1-n}$ is detected using a kernel function including a kernel element for each of a visual style, an audio style and a gameplay style.

Figure 2:
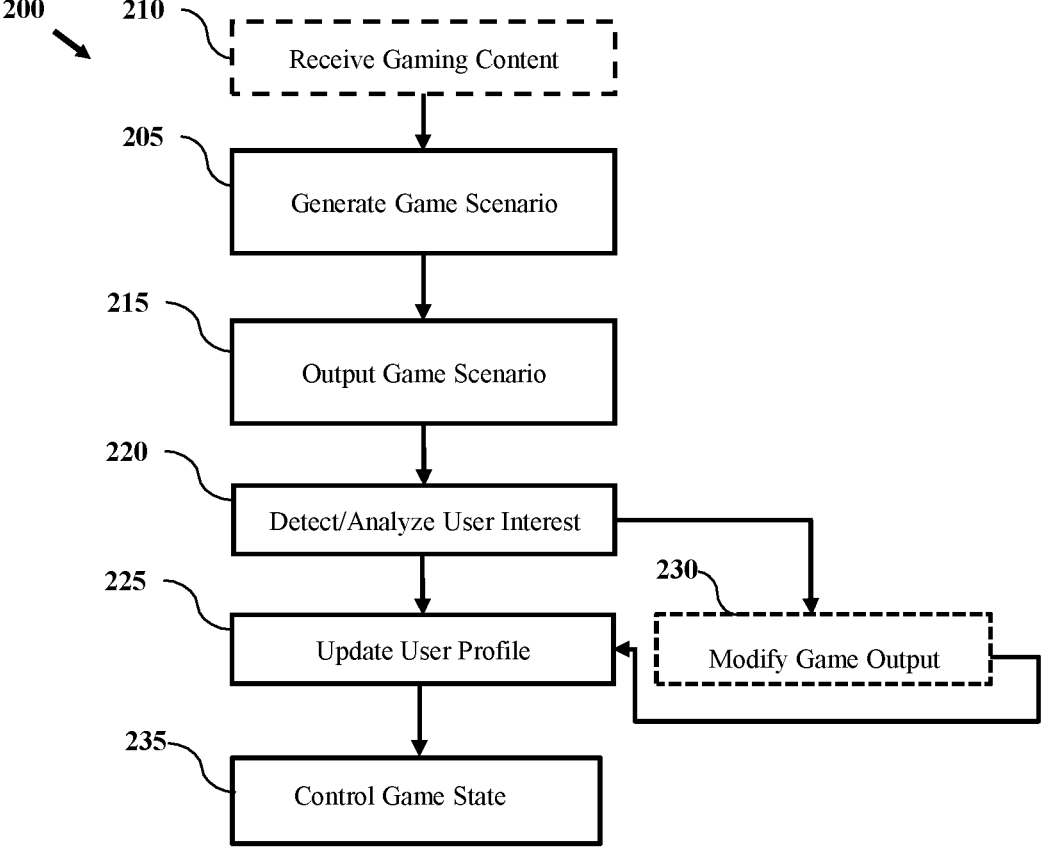
FIG. 2 illustrates a process for dynamically analyzing and modifying a game environment according to one or more embodiments.

FIG. 2 illustrates a process for dynamically analyzing and modifying a game environment according to one or more embodiments. Process 200 may determine one or more parameters for gam scenarios, collect behavior data for generated scenarios, update user profiles and control game operations based on user profiles, and provide detailed context sensitive game guidance. Process 200 may be performed by a device, such as device 300 and/or controller 305 of FIG. 3A or control device 355 of FIG. 3B.

Process 200 may be initiated by a device generating at least one game scenario for an electronic game at block 205. According to embodiments, game scenarios may be generated to include control settings for an audio configuration, a video configuration and a gameplay configuration. Control settings for the audio configuration can include at least one of a sound style and audio output style. Similarly, control settings for the video configuration can include at least one of a light level, color scheme, and scenery. Control settings for the gameplay configuration can include at least one of a combat level, exploration level and narrative level. Game scenarios may be generated to modify one or more elements of a game environment while maintaining one or more game features. By way of example, for a narrative based game one or more of the audio output style (e.g., music, sound effects, etc.) and display characteristics may be modified while still presenting a player controlled object and object pathways/structure of the game. For a fighting game, one or more of a number of game controlled characters, character type, and fighting styles may be modified while still presenting a player controlled character in a game state.

Process 200 may be employed in a framework described herein for one or more of analysis and modification. With respect to analysis, game scenarios generated at block 205 may be generated to identify a user preference. With respect to game implementation, game scenarios generated at block 205 may be based on user parameters to generate a scenario based on a user profile and as a basis for updating an existing profile. According to embodiments, generating at least one game scenario at block 205 includes generating one or more scenarios, such as a first game scenario and a second game scenario. The first game scenario includes a first set of control settings and the second scenario includes a second set of control settings. Process 200 may output one or more scenarios as output of gaming content during gameplay.

Game scenarios generated at block 205 may be based on gaming content received by a device. According to embodiments, process 200 may optionally include receiving gaming content at block 210. For example, game data such as rendered graphics, data for rendering graphics, control data, video data and audio data may be received for a game. At optional block 210 receiving game content can include can include receiving user permission or an indication of user permission for process 200 to operate (i.e., user opt-in).

At block 215, process 200 can output the at least one game scenario using the control settings. Output of game scenarios can include presenting game content (audio, video, etc.) to one or more output devices, such as display, speaker, headset, wearable device, etc. During the output of the game scenario, the control device may detect and/or receive input to analyze user interest with respect to the game scenario. According to embodiments, outputting a game scenario includes modifying one or more features of gameplay, including at least one of audio, video and gameplay style. By way of example, elements of a game may be retained, such as a player controlled object, game pathway and storyline/game mission, while modifying the background, number of game enemies, modifying audio style, etc. By modifying gameplay, one or more aspects of the game experience may be updated to determine gameplay environments that suit a players preferences. As such, modification may include modifying one or more of audio, visual and gameplay style attributes while still maintaining a game vector and game events. During an experiment phase, the game scenarios generated may be presented to capture data from a user, such as a scenarios where the user is prompted or presented with elements that require more exploration or more characters to battle against.

At block 220, process 200 includes detecting user interest for the at least one game scenario for at least one user. According to embodiments, user interest for the at least one game scenario is detected using a kernel function including a kernel element for each of a visual style, an audio style and a gameplay style. Detection of user interest, and characterization as a kernel function may allow for user behavior to be detected. One or more of the impact of game scenarios, difficulty, and user engagement can be represented by the kernel function. For a game title with a particular landscape, land missions and certain narrative aspects of the game can be evaluated. In addition, introduction sessions to one or more levels or game configurations can be provided to users with a game scenario.

Detecting user interest can include detection of one or more parameters by a gaming system. According to embodiments, a device may determine a value for user time associated with the at least one game scenario. By way of example, the device may track time a user spends in a scenario. A device may be configured to determine a level of interest based on time spent in a game scenario, wherein a higher period of time may indicate a higher level of interest for a user compared to less time spent. The device may also track user inputs to return to a scenario and user selections of a game scenario. User interest may be detected by a device characterizing user game element control associated with the at least one game scenario. For example, character controls to explore more than half of a game scenario, or more that a predetermined percentage (e.g., 25%) may indicate a level of interest. Similarly, user interest may be detected by characterizing user interaction with game elements in the at least one game scenario. Interaction with more than a predetermined percentage of game objects may indicate user interest.

According to embodiments, user interest may be determined by characterizing user control inputs associated with the at least one game scenario. By way of example, user commands may be detected and characterized based on the number of inputs, pace of inputs and input pattern. Controlled and deliberate commands may indicate user interest, where frenzied or erratic control inputs may be indicative of user frustration. Similarly, detection of repeated commands to exit a game scenario may indicate a low level of user interest.

At block 225, process 200 includes updating a user profile for the at least one user based on detected user interest for the at least one game scenario. Based on one or more parameters detected for a user and the game scenario, process 200 may incorporate one or more features with respect to audio style, video style and game play style that are liked and/or disliked by a user. Updating the user profile can includes classifying the at least user with at least one hierarchical data cluster for game scenario parameters. As discussed below with reference to FIG. 7, the hierarchical data cluster may group one or more scenarios or clusters or parameters that align with a user profile.

Process 200 may optionally include modifying game output at block 230. Based on user interest detected at block 220, process 200 may modify game output of an electronic game. Game output may be modified at block 230 to provide a different game scenario, such as a second game scenario. One or more additional game scenarios may be output to allow process 200 to provide several scenarios for updating a user profile. The modified game output can include at least one game scenario presenting game content with different audio, video, and/or gameplay style etc.) to assess user interest with respect to additional parameters. Generating scenarios may include generating diverse scenarios to determine user preferences, including likes, dislikes, etc.). Scenarios may be game specific, such that game data may be incorporated and/or detected for generating one or more of the audio, video and game play style.

At block 235, process 200 includes controlling output of a game state for the electronic game using the user profile. Output of game states and game operation at block 235 may be based on a user profile and one or more updates. By controlling game state with a user profile, game content and elements may be generated to include one or more parameters in line with user preferences. In addition, one or more settings may be generated without requiring a user to manually input settings in a game interface. Moreover, user profiles for one or more users may be utilized to output and control gaming content for a plurality of users. When game states are controlled, output of the game state can include modifying at least one parameter of the electronic game with an updated user profile for the at least one user.

According to embodiments, operations of process 200 may utilize a framework for dynamically modifying a gameplay environment. Process 200 may include operations associated with the framework described in connection with process 400 of FIG. 4. As such operations at blocks 205 and 210 may be associated with an experiment phase, operations at blocks 220 and 225 with an analysis phase, and operations at block 235 associated with a game phase.

Figure 3A:
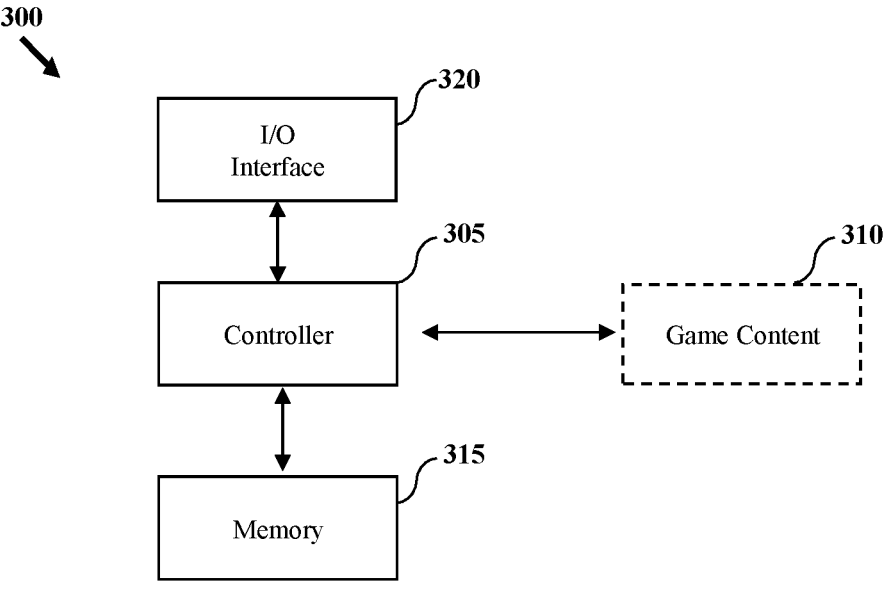
FIG. 3A illustrates a graphical representation of a device configuration according to one or more embodiments.

FIG. 3A illustrates a graphical representation of a device configuration according to one or more embodiments. Device 300 is configured for dynamically analyzing and modifying a game environment. Device 300 can provide one or more components and functions of control device 130.

Device 300 may be a control device or game console device which can include controller 305, memory 315 and input/output (I/O) interface 320. Device 300 may represent one or more of a gaming console, computing device and electronic device in general configured to output one or more of video, audio and game data to an output device. Device 300 may also optionally include game content 310. Controller 305 may relate to a processor or control device configured to execute one or more operations stored in memory 315, such as processes for dynamically analyzing and modifying a game environment. Memory 315 may be non-transitory memory configured to provide data storage and working memory operations for device 300. Memory 315 may be configured to store computer readable instructions for execution (e.g., executable instructions) by controller 305 for one or more processes described herein. Device 300 may be configured to receive gaming media (e.g., card, cartridge, disk, etc.) and output visual and audio content of the gaming media to an output device, such as a display.

Figure 3B:
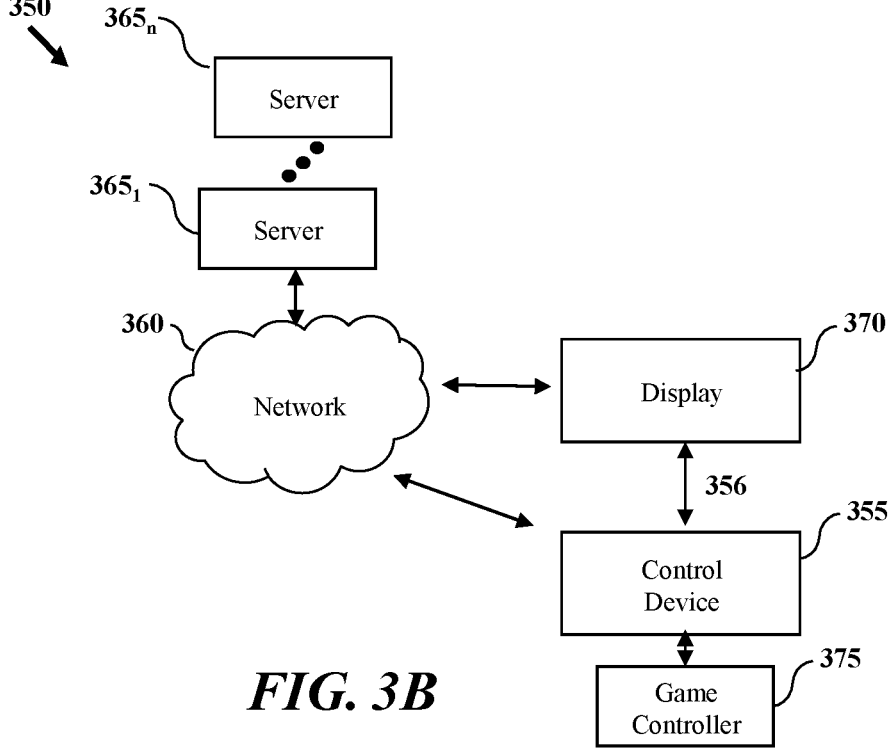
FIG. 3B illustrates a graphical representation of a system configuration according to one or more embodiments.

According to embodiments, controller 305 may be configured to generate at least one game scenario for an electronic game. The game scenarios can include control settings for an audio configuration, a video configuration and a gameplay configuration. Controller 305 may also be configured to output game scenarios using the control settings, and detect user interest for game scenarios. Controller 305 may detect interest for game scenarios using a kernel function including a kernel element for each of a visual style, an audio style and a gameplay style. Controller 305 can update a user profile for the at least one user based on detected user interest for the at least one game scenario. Controller 305 may be configured to control output of a game state for the electronic game using the user profile FIG. 3B illustrates a graphical representation of a system configuration according to one or more embodiments. According to embodiments, game scenarios may be generated and gaming content may be output by a device and/or a system. A system can include one or more components and devices. FIG. 3B illustrates system 350 according to embodiments which can include control device 355 (e.g., device 300). Control device 355 may be one or more of a gaming console, computing device and electronic device in general configured to output gaming content 356 to display 370. With respect to gaming content, control device 355 may be configured to output data for presentation by a display, or visual output device in general, including graphics (2D and 3D), sound and data. Control device 355 may also be configured to output non-gaming content, such as video content, visual content, audio content, etc.

Control device 355 may be configured to receive data from one or more of servers 3651-*n* to present and output game content. For network games, control device 355 may receive game data from a network source, such as servers 3651-*n*, by way of network 360 and may be configured to generate gaming scenarios for the game data. Control device 355 may be configured to receive input from one or more peripheral devices, such as game controller 375.

According to embodiments, control device 355 may be configured to determine and/or update one or more user profiles for a game environment. User profiles may be updated using data received from one or more of display 370 and controller 375.

Figure 4:
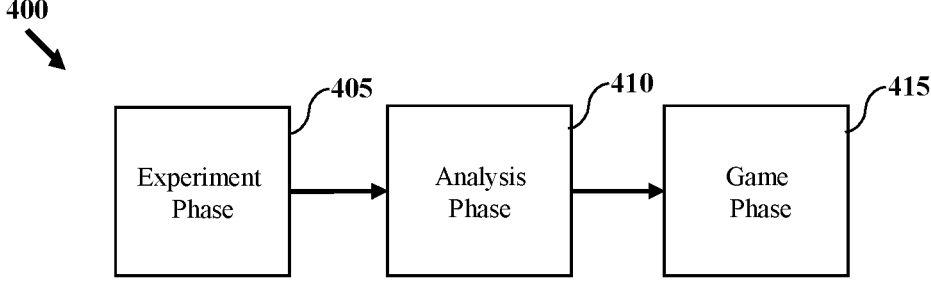
FIG. 4 illustrates a graphical representation of a process for analyzing and modifying a game environment according to one or more embodiments.

FIG. 4 illustrates a graphical representation of a process for analyzing and modifying a game environment according to one or more embodiments. According to embodiments, process 400 may provide a framework for operations of a device and one or more phases for dynamically modifying a game environment and real time collection of user preferences. Process 400 includes experiment phase 405, analysis phase 410 and game phase 415. According to embodiments, process 400 may be performed by a device to generate one or more scenarios for modification of a gameplay environment. According to embodiments, modification of gameplay environment can include generation of one or more experimental scenarios, such as a diverse set of scenarios in experiment phase 405 and allowing a user to play a game and explore multiple scenarios. User interaction with the scenarios may be detected and processed during analysis phase 410. According to embodiments, analysis phase may process user operations using one or more models (e.g., machine learning (ML) models) to extract one or more gameplay preferences of a user. Operations during analysis phase may identify one or more of visual, audio, and gameplay preferences for users. Scenarios generated and presented for a user may be used as a basis for learning a user's style and preferences. Process 400 includes a game phase 415 which can allow for implementation of user preferences into game operation and for gameplay augmentation. Game phase 415 may include operations to use a user profile for generating gaming content. By way of example, user profiles may be generated and/or updated to indicate preferences or identify particular styles that a user likes or at least tolerates during game play. In addition, embodiments, allow for game phase 415 to be deployed locally to allow for modification of game elements local to a user to improve game processing. Operations for experiment phase 405 and analysis phase 410 are discussed in more detail in FIGS. 5 and 6, respectively.

Figure 5:
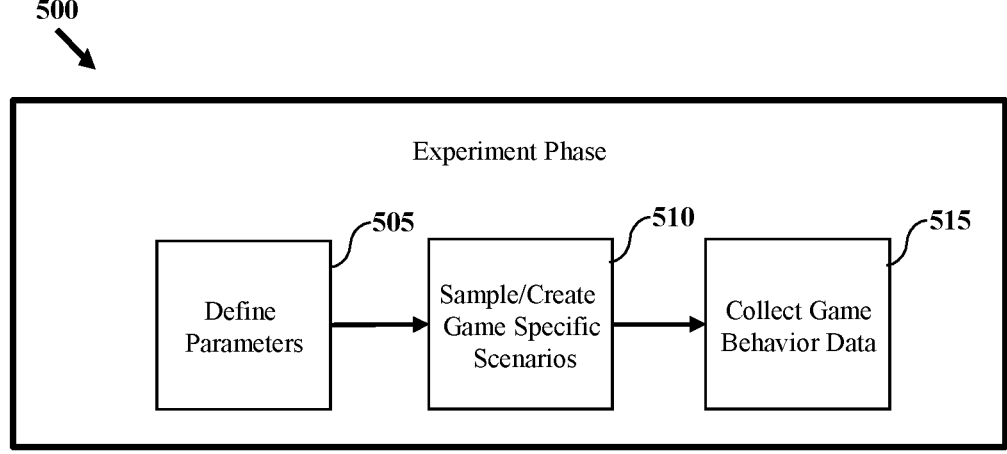
FIG. 5 illustrates a graphical representation of an experiment phase according to one or more embodiments.

FIG. 5 illustrates a graphical representation of an experiment phase according to one or more embodiments. According to embodiments, processes and device configurations are provided to analyze and modify a game environment. Operations may be associated with an experiment phase 500 (e.g., experiment phase 405). Experiment phase 500 may include one or more operations to determine one or more parameters for adapting game events to suit player preferences. Operations in experiment phase 500 may be performed for generating a game scenario. At block 505, experiment phase 500 includes defining parameters for generating a game scenario. At block 510, the experiment phase can include sampling/creating game specific scenarios and at block 515 experiment phase 500 can include collecting game behavior data.

According to embodiments, experiment phase 500 at block 505 includes defining one or more parameters to be varied. Parameters for a game scenario can include an audio style (e.g., classical, funky, horror, retro, etc.) for selection or modifying game audio and game music. Parameters for a game scenario can include a video style to include graphical settings, such as one or more of white balance, contrast, brightness, color schemes, etc. Parameters for a game scenario can include a gameplay style, such as one or more of a combat, exploratory, and narrative style. At block 510 one or more sample scenarios or game scenarios may be generated. The scenarios may be generated to identify parameters of interest for a user. By way of example, a first scenario (e.g., scenario 1) may include a game setting for visiting a village with retro background music and bright landscape and the goal involved fighting. Alternatively, a second scenario (e.g., scenario 2) may include a game setting for visiting a village with retro background music and bright landscape and the goal involves exploring to find items. By providing two scenarios, player preference for gameplay style may be isolated within a game state or game environment for visiting a village. Similarly, multiple scenarios can be generated in-game as part of story. At block 515, game behavior data may be collected for a user. Data collection may be an ongoing process or operation. For each scenario, collected game behavior data can include measuring time spent by players, detecting smooth or erratic player operation, capturing the pattern of button presses (joystick moves and/or buttons used for combat), and user interaction levels with the environment. It should be appreciated that parameters for game scenarios are exemplary and may include other characteristics for modification with game scenarios.

Figure 6:
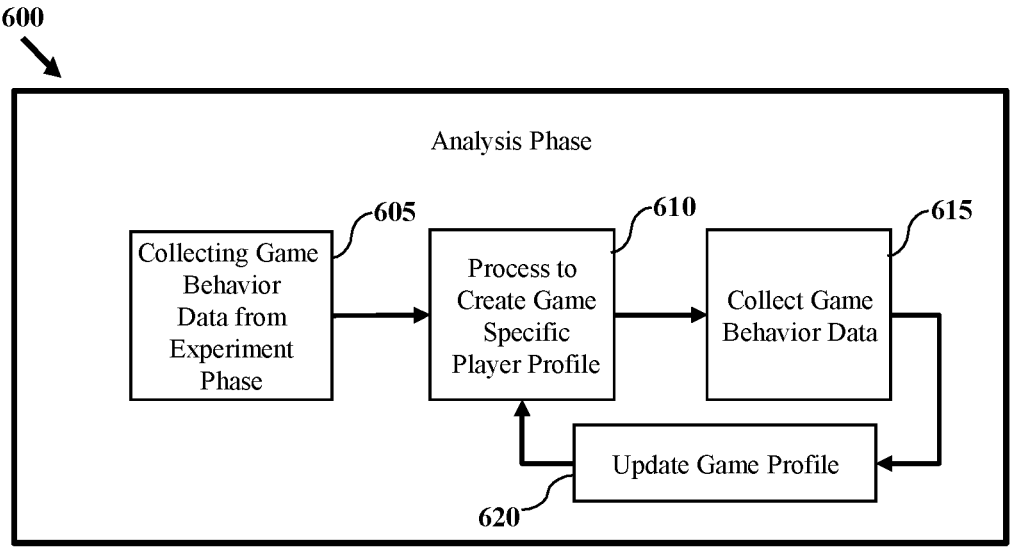
FIG. 6 illustrates a graphical representation of an analysis phase according to one or more embodiments.

FIG. 6 illustrates a graphical representation of an analysis phase according to one or more embodiments. Analysis phase 600 includes collecting game behavior data at block 605 from the experiment phase, and processing at block 610 to create a game specific player profile. Analysis phase 600 can also include collecting game behavior data at block 615 and updating a game profile at block 620.

Analysis phase 600 may receive game behavior data from an experiment phase at block 605 as input for one or more models (e.g., machine learning models) for determining game specific player preferences. One or more of an audio style, video style and gameplay style preferences may be determined for a user. According to embodiments, game behavior data in analysis phase 600 may be detected at block 615 for a plurality of user. Game behavior for the users may be processed using hierarchical clustering, such that different user gameplay data (e.g., preferred mini scenarios) may be used to create various groups and can classify users to relevant clusters. Clusters may be fine-tuned as gameplay data is detected and one or more game profiles may be updated at block 620. Gameplay data may be processed using one or more deep learning models to measure player immersion based on controller and in game behavior. According to embodiments, the user profiles may be updated and/or fine-tuned during game play. Recommender systems and/or collaborative filtering to quantify user similarities and preferences among groups of users. As such, users with similar preferences may be grouped for game activities.

According to embodiments, a game phase may provide implementation or the parameters determined from the experiment phase and user profile from the analysis phase. According to embodiments, implementation of a user profile may be to control output for each game event with parameters associated with video, audio, and gameplay styles. Generated profiles may be used to optimally define the parameters for game events. In addition, implementation may include procedures for fine-tuning game events and/or objectives of a game while maintaining game narrative/storyline. Embodiments may include use of one or more models, such as machine learning models to generate different combination of styles. By way of example, if a player prefers bright landscapes, vintage landscapes and exploratory gameplay style, the future game events will be more stylized towards those preferences.

Figure 7:
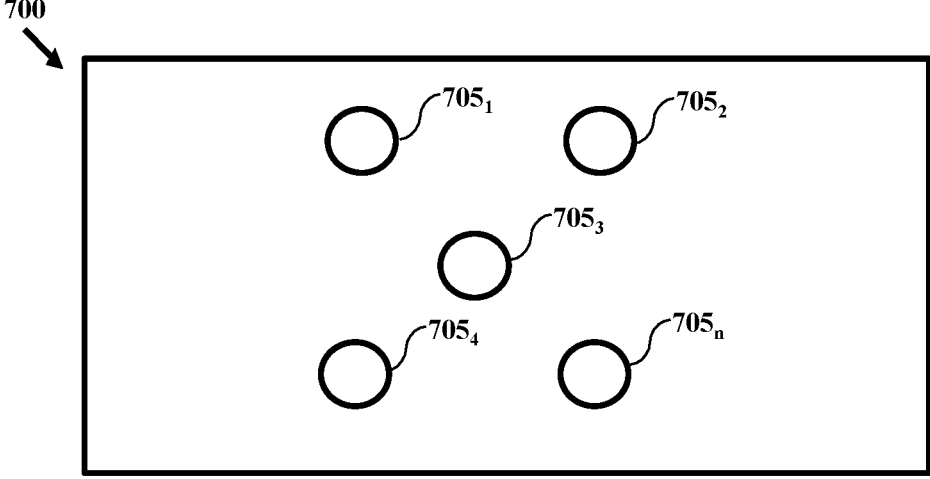
FIG. 7 illustrates a graphical representation of in game experiments or worlds according to one or more embodiments.

FIG. 7 illustrates a graphical representation of in game experiments or worlds according to one or more embodiments. According to embodiments, user preferences may be captured and represented by a kernel function. The kernel function may be used as a measure of user interest and for selection of one or more parameters for modifying game play. Game play modification may be performed on a front end, such that game functions may be preserved for one or more network games and to allow for personalization to a local device for a user.

FIG. 7 illustrates game data 700 including plurality in game levels or worlds $705_{1-n}$ shown as circles. According to embodiments, in-game experiments or worlds $705_{1-n}$ may be generated and designed for each user and personalized with scenarios. After the user plays a level, such as level $705_1$, user interaction behavior is analyzed using one or more models (e.g., ML methods) to characteristically define user preferences. User preferences would be captured in a kernel function. As such, the kernel function supports processed for user preference capturing and can track changing preferences of the user as the game progresses. User preferences may be represented using different kernels. For example, a user function may be represented as $$\text{User} \leftarrow K_V(V) + K_A(A) + K_{GP}(GP)$$

where $K_V$, $K_A$, and $K_{GP}$ represent the kernels for visual, audio, and gameplay front-end features respectively. FIG. 7 illustrates a schematic of an experiment design within a game, with experiments generated to capture user preferences by dynamically designing the game environment around the user. Learned kernel metrics can define the user preference and can be utilized for applications, such as game personalization. According to embodiments, generating in-game experiments and worlds may include one or more characteristics shared between worlds. For example, one or more of a video style, audio style and gameplay style of a world may be shared or similarly used by another world. Each game scenario may include a combination of characteristics which may be independent and varied from other game scenarios. It should also be appreciated that game data 700 and game levels or worlds $705_{1-n}$ may represent worlds in an experiment phase and/or for final game phases.

Figure 8:
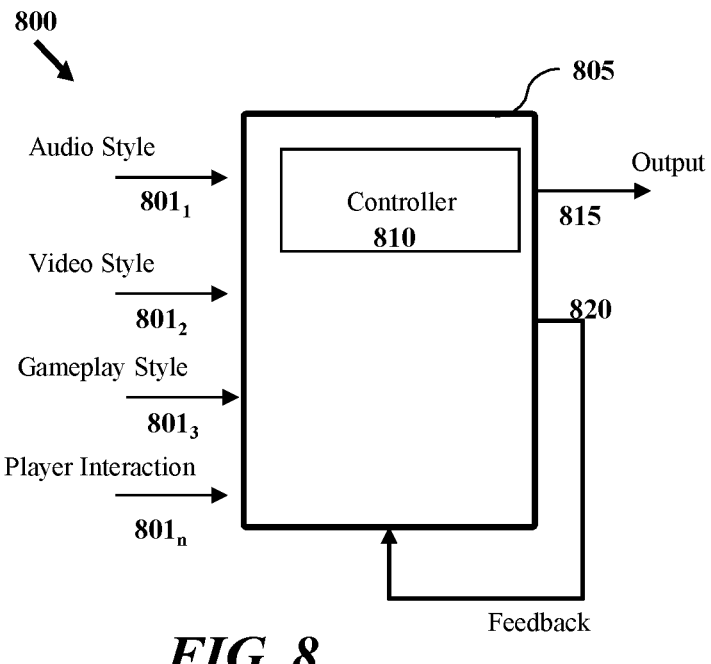
FIG. 8 illustrates a graphical representation of game specific training according to one or more embodiments.

FIG. 8 illustrates a graphical representation of game specific training according to one or more embodiments. According to embodiments, user profiles and preferences may be generated and updated using one or more game scenarios. Game scenarios may be generated using one or more processed and models. Information for a user, including user preferences, control inputs and habits may be determined and used as training inputs for a model to generated game scenarios. In addition, a user profile may be determined for each user. FIG. 8 illustrates training process 800 which can include receiving parameters $801_{1-n}$ as training input by a device 805 including a controller 810. According to embodiments, controller 810 may receive a plurality of interactions for one or more game titles as training input. In embodiments, parameters $801_{1-n}$ may include audio style $801_1$, video style $801_2$, gameplay style $801_3$, and player interactions audio style $801_n$. Based on the training in process 800, controller 810 may generate output 815. Output 815 may include one or more game scenarios, such as modifications to sound output, video style, updates to graphical elements and changes in game play style. According to embodiments, controller 810 may be configured to generate output 815 based on a recursive loop including training and feedback. Feedback loop 820 may provide information such as user interaction for output 815.

According to embodiments, training process 800 and controller 810 may be configured to use one or more learning models (e.g., artificial intelligence, iterative models, etc.) to user data. Training process 800 and controller 810 may use one or more libraries of common responses. According to embodiments, output 815 may include output of gaming content with modified parameters, including modified sound output, video output and/or modified gaming content.

While this disclosure has been particularly shown and described with references to exemplary embodiments thereof, it will be understood by those skilled in the art that various changes in form and details may be made therein without departing from the scope of the claimed embodiments.

What is claimed is:

1. A method for dynamically analyzing and modifying a game environment, the method comprising:

receiving, by a device, first gaming content for an electronic game, the first gaming content representing a first game scenario, the first game scenario including first control settings for a first audio configuration, a first video configuration, and a first gameplay configuration;

generating, by the device a second game scenario for the electronic game, wherein the second game scenario includes second control settings for one of a second audio configuration, a second video configuration, and a second gameplay configuration based on the first gaming content;

outputting, by the device, the second gaming content to incorporate the second game scenario using the second control settings;

detecting, by the device, user interest for at least one of the second audio configuration, or the second gameplay configuration, wherein user interest is detected using a kernel function including a kernel element for each of a visual style, an audio style and a gameplay style;

updating, by the device, a user profile based on the detected user interest; and controlling, by the device, output of a game state for the electronic game using the user profile, the game state representing at least one of the second audio, or the second gameplay configuration based on the user interest.

2. The method of claim 1, wherein the first control settings for the first audio configuration include at least one of a sound style and audio output style, control settings for the first video configuration include at least one of a light level, color scheme, and scenery, and control settings for the first gameplay configuration include at least one of a combat level, exploration level, and narrative level.

3. The method of claim 1, wherein detecting user interest includes determining a value for user time associated with the first game scenario.

4. The method of claim 1, wherein detecting user interest includes characterizing user game element control associated with the first game scenario.

5. The method of claim 1, wherein detecting user interest includes characterizing user control inputs associated with the first game scenario.

6. The method of claim 1, wherein detecting user interest includes characterizing user interaction with game elements in the first game scenario.

7. The method of claim 1, wherein updating the user profile includes classifying a user with at least one hierarchical data cluster for game scenario parameters.

8. The method of claim 1, wherein controlling output of the game state includes modifying at least one parameter of the electronic game with an updated user profile.

9. The method of claim 1, further comprising modifying game output of the electronic game using the detected user interest.

10. A device configured for dynamically analyzing and modifying a game environment, the device comprising:

an interface;

a memory storing executable instructions; and a controller coupled to the interface and the memory, wherein the controller is configured to:

receive first gaming content for an electronic game, the first gaming content representing a first game scenario, the first game scenario including first control settings for a first audio configuration, a first video configuration, and a first gameplay configuration;

generate a second game scenario for the electronic game, wherein the second game scenario includes second control settings for one of a second audio configuration, a second video configuration, and a second gameplay configuration based on the gaming content;

output the second gaming content to incorporate the second game scenario using the second control settings;

detect user interest for at least one of the second audio configuration, or the second gameplay configuration, wherein user interest is detected using a kernel function including a kernel element for each of a visual style, an audio style and a gameplay style;

update a user profile based on the detected user interest; and control output of a game state for the electronic game to the user interest using the user profile, the game state representing at least one of the second audio, or the second gameplay configuration based on the user interest.

11. The device of claim 10, wherein the first control settings for the first audio configuration include at least one of a sound style and audio output style, control settings for the first video configuration include at least one of a light level, color scheme, and scenery, and control settings for the first gameplay configuration include at least one of a combat level, exploration level, and narrative level.

12. The device of claim 10, wherein detecting user interest includes determining a value for user time associated with the first game scenario.

13. The device of claim 10, wherein detecting user interest includes characterizing user game element control associated with the first game scenario.

14. The device of claim 10, wherein detecting user interest includes characterizing user control inputs associated with the first game scenario.

15. The device of claim 10, wherein detecting user interest includes characterizing user interaction with game elements in the first game scenario.

16. The device of claim 10, wherein updating the user profile includes classifying a user with at least one hierarchical data cluster for game scenario parameters.

17. The device of claim 10, wherein controlling output of the game state includes modifying at least one parameter of the electronic game with an updated user profile.

18. The device of claim 10, wherein the controller is further configured to modify game output of the electronic game using the detected user interest.

* * * * *